US008806327B2

(12) United States Patent
Morris

(10) Patent No.: US 8,806,327 B2
(45) Date of Patent: Aug. 12, 2014

(54) SYSTEM AND METHOD FOR DISPLAYING UNREQUESTED INFORMATION WITHIN A WEB BROWSER

(75) Inventor: Darren Morris, West Sussex (GB)

(73) Assignee: III Holdings 1, LLC, Wilmington, DE (US)

(*) Notice: Subject to any disclaimer, the term of this patent is extended or adjusted under 35 U.S.C. 154(b) by 997 days.

(21) Appl. No.: 11/161,740

(22) Filed: Aug. 15, 2005

(65) Prior Publication Data
US 2007/0038956 A1 Feb. 15, 2007

(51) Int. Cl.
G06F 17/00 (2006.01)
G06F 3/048 (2013.01)

(52) U.S. Cl.
USPC .......................................... 715/234; 715/808

(58) Field of Classification Search
USPC ......... 715/513, 234, 246, 711, 808, 861, 243; 709/219
See application file for complete search history.

(56) References Cited

U.S. PATENT DOCUMENTS

| | | | | |
|---|---|---|---|---|
| 5,737,619 A * | 4/1998 | Judson | | 715/236 |
| 6,185,589 B1 * | 2/2001 | Votipka | | 715/206 |
| 6,362,840 B1 * | 3/2002 | Burg et al. | | 715/835 |
| 6,658,419 B2 * | 12/2003 | Pasquali | | 707/10 |
| 6,762,777 B2 * | 7/2004 | Carroll | | 715/808 |
| 6,785,717 B1 * | 8/2004 | Nickerson et al. | | 709/219 |
| 6,785,891 B1 * | 8/2004 | Allen et al. | | 719/313 |
| 6,934,743 B2 * | 8/2005 | Huat | | 709/218 |
| 6,978,418 B1 * | 12/2005 | Bain et al. | | 715/205 |
| 6,983,421 B1 * | 1/2006 | Lahti et al. | | 715/763 |
| 7,003,734 B1 * | 2/2006 | Gardner et al. | | 715/808 |
| 7,225,142 B1 * | 5/2007 | Apte et al. | | 705/14.39 |
| 7,246,324 B2 * | 7/2007 | Mikhail et al. | | 715/760 |
| 7,278,114 B2 * | 10/2007 | Lapidous | | 715/808 |
| 7,325,204 B2 * | 1/2008 | Rogers | | 715/792 |
| 7,379,976 B2 * | 5/2008 | Huat | | 709/218 |
| 7,395,500 B2 * | 7/2008 | Whittle et al. | | 715/243 |
| 7,412,655 B2 * | 8/2008 | Wada et al. | | 715/744 |
| 7,412,661 B2 * | 8/2008 | Sellers et al. | | 715/779 |
| 7,434,177 B1 * | 10/2008 | Ording et al. | | 715/862 |
| 7,475,404 B2 * | 1/2009 | Hamel | | 719/317 |
| 7,546,539 B2 * | 6/2009 | Kibilov et al. | | 715/760 |
| 7,975,019 B1 * | 7/2011 | Green et al. | | 709/217 |
| 8,146,013 B2 * | 3/2012 | Bhogal et al. | | 715/808 |
| 2002/0007393 A1 * | 1/2002 | Hamel | | 709/203 |
| 2002/0075332 A1 * | 6/2002 | Geilfuss et al. | | 345/859 |
| 2002/0104096 A1 * | 8/2002 | Cramer et al. | | 725/113 |

(Continued)

OTHER PUBLICATIONS

Javascript-coder, Javascript Popup Window, Jun. 21, 2003, Javascript-Coder, pp. 1-21.*

(Continued)

Primary Examiner — Manglesh M Patel

(57) ABSTRACT

A system and method for generating popup content in response to user's actions within an enabled web page is disclosed. Generation of the popup occurs in response to a user triggered event which invokes a script referencing a secondary web page to display within the bounds of the enabled web page. The user triggered event results from movement of a mouse pointer or a keyboard event which may indicate a user's intention to exit the web page by closing the web browser window or navigating to a different web site or web page. The resulting popup is contained within the web page content itself, thereby resulting in a less intrusive popup display and avoiding the effects of popup suppression utilities.

19 Claims, 4 Drawing Sheets

(56) References Cited

U.S. PATENT DOCUMENTS

| | | | |
|---|---|---|---|
| 2002/0152110 A1* | 10/2002 | Stewart et al. | 705/10 |
| 2002/0152237 A1* | 10/2002 | Cohen et al. | 707/513 |
| 2002/0152238 A1* | 10/2002 | Hayes | 707/513 |
| 2002/0154163 A1* | 10/2002 | Melchner | 345/749 |
| 2002/0178187 A1 | 11/2002 | Rasmussen et al. | |
| 2003/0028565 A1 | 2/2003 | Landsman et al. | |
| 2003/0040970 A1* | 2/2003 | Miller | 705/26 |
| 2003/0066031 A1* | 4/2003 | Laane | 715/513 |
| 2003/0146939 A1* | 8/2003 | Petropoulos et al. | 345/810 |
| 2004/0024615 A1 | 2/2004 | Monteleone et al. | |
| 2004/0073634 A1* | 4/2004 | Haghpassand | 709/220 |
| 2005/0033641 A1* | 2/2005 | Jha et al. | 705/14 |
| 2005/0278641 A1* | 12/2005 | Mansour et al. | 715/749 |
| 2006/0031404 A1* | 2/2006 | Kassab | 709/218 |
| 2008/0319856 A1* | 12/2008 | Zito et al. | 705/14 |
| 2009/0164940 A1* | 6/2009 | Wampler | 715/808 |

OTHER PUBLICATIONS

International Preliminary Report on Patentability dated Aug. 31, 2007 in Application No. PCT/US2005/031033.

Written Opinion dated Mar. 24, 2006 in Application No. PCT/US2005/031033.

International Search Report dated Mar. 24, 2006 in Application No. PCT/US2005/031033.

\* cited by examiner

SYSTEM AND METHOD FOR DISPLAYING UNREQUESTED INFORMATION WITHIN A WEB BROWSER

FIELD OF INVENTION

The invention generally relates to the display of un-requested information within a web browser, and more particularly, to a system and method for displaying information within a popup area within primary web page content based on a user event.

BACKGROUND OF INVENTION

The internet has spawned a large number of new enterprises and has provided an alternative media for existing businesses and organizations. Directing prospective customers to a web site and keeping them interested has become a unique advertising and marketing niche. Because there are most often a number of businesses competing for the same web traffic, methods have been developed to attempt to persuade the prospective customers to revisit the site once he or she has navigated away from the site or closed the browser window. For example, many sites invite and/or require prospective customers to fill out web forms to request additional information or to make a purchase. In most cases, the first required field is the prospective customer's email address. Therefore, if the prospective customer navigates away from the site or closes the browser window prior to completing the form, an email inviting the prospect back can be generated and sent. However, this is only effective if the prospect has at least started filling out a form.

To attempt to persuade a prospective customer to return to a site when the identity of the prospective customer is unknown, popup windows have been deployed. Popup windows are activated by an event that is generated by a browser application. Web browser applications generate event messages to enable web site developers to add sophistication to their web pages by triggering a script to perform a function when a particular event is encountered. However, while popup windows have proven to be effective from the merchant perspective, they can be an annoyance from the prospective customer's perspective. Therefore, developers have created blockers which detect a popup before it is visible to the user and then close the popup window. Because popup blockers are generally free to the public, popup ads have become far less effective.

Therefore, a need exists for a system and method for displaying information within a popup content area of a web page without launching a new window, thereby avoiding the effects of a popup suppression utility. Further, a need exists for a less intrusive means to display information while preserving the visual impact and attention-grabbing nature of popup windows.

SUMMARY OF INVENTION

The invention enables web sites to monitor user events and trigger popup content having secondary web page content based on user intentions. When a web page is transmitted to a browser, a JavaScript file is transmitted with it. The JavaScript file contains a reference to a secondary HTML page. The invention employs a hidden area which remains statically positioned at or near the top of a web page and extends horizontally, spanning the width of the page within a browser. When a user directs his or her mouse pointer over the hidden area of the web page, an event is fired. The event is captured by a handler which is scripted into the web page which invokes the JavaScript file. The JavaScript file facilitates the generation of the popup by integrating content from the secondary HTML file into the content of the web page, thereby creating the popup.

More particularly, the computer-implemented method facilitates a display of popup content within a web page by incorporating a hidden area into a field of the web page, wherein the hidden area facilitates the display of popup content and wherein the field is located between primary web page content and a browser toolbar; and, causing the popup content to be displayed upon a mouse pointer interfacing with the hidden area.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
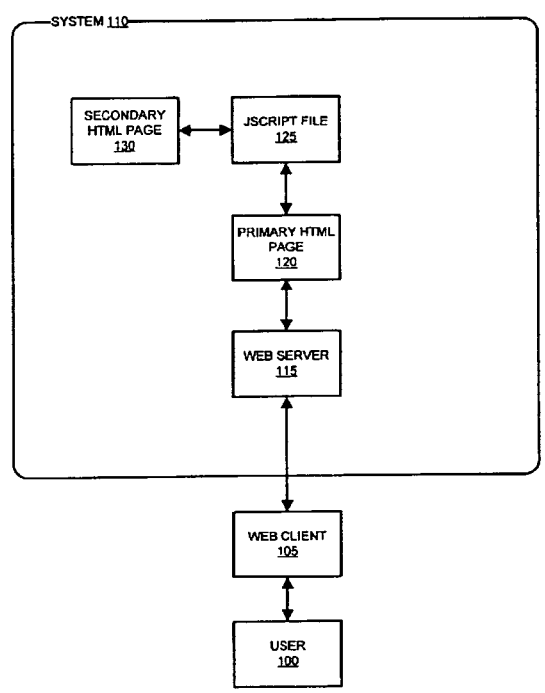
FIG. 1 is a block diagram illustrating the major system components for an exemplary system for displaying a popup display area within a web page.

In general, the invention includes a system and method for presenting information within popup content to dissuade users from moving a mouse pointer towards the browser toolbar and attempting to navigate away from a web site or closing a browser window. When triggered by mouse movement over a hidden area of the primary web page, the invention displays information from a secondary web page within the body of a primary web page. With reference to FIG. 1, the invention facilitates the display of popup information to a user 100 viewing a web page at a web client 105. Web client 105 is connected to a web server 115 through a network connection (e.g., Internet, Intranet, LAN, WAN).

In addition to the components discussed above, system 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the invention.

As will be appreciated by one of ordinary skill in the art, the invention may be embodied as a customization of an existing system, an add-on product, upgraded software, a stand alone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interacts with the invention by interacting with popup enabled web pages. Such web pages may facilitate allowing pre-determined actions to invoke a JavaScript file 125 to insert content from a secondary web page into the content of the enabled web page. User 100 may be, for example, a prospective customer, an existing customer or any entity that has interest in the products, services or information offered within at least one popup enabled web page. User 100 may interface with the web messaging system 110 via any communication protocol, device or method discussed herein or known in the art. In one embodiment, user 100 may interact with the invention via an Internet browser at a web client 105.

Web client 105 may comprise any hardware and/or software suitably configured to facilitate input, receipt and/or review of information presented within a web page or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the invention. For example, web client 105 may access the services of the invention through another server, which may have a direct or indirect connection to web server 120.

As those skilled in the art will appreciate, web client 105 may include an operating system (e.g., Windows NT, 95/98/2000, OS2, UNIX, Linux, Solaris, MacOS, etc.) as well as various conventional support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, biometrics, grid computing and/or mesh computing.

Web server 115 may include any hardware and/or software suitably configured to facilitate communications between web client 105 and one or more popup system 110 components. Further, web server 115 may be configured to transmit data to web client 105 within markup language documents. Web server 115 may operate as a single entity in a single geographic location or as separate computing components located together or in separate geographic locations. Requests originating from client browser 105 may pass through a firewall before being received and processed at web server 115. As used herein, "transmit" may include sending electronic data from one system component to another over a network connection. Additionally, as used herein, "data" may include encompassing information such as commands, queries, files, data for storage, and the like in digital or any other form.

Web server 115 discussed herein may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

While the figures and descriptions thereof make frequent reference to JavaScript, those skilled in the art will appreciate that other scripting languages may be equally effective and applicable to the invention. For example, the generation of the popup may be carried out through invoking VBScript, PHP, PERL and the like. Further, reference is made herein to HTML files. The invention may be employed within any current or future web page markup languages.

In one embodiment, the invention may include any number of databases for storing customer information, product information, information relating to web pages, content used in the generation of the popup of the invention, and the like. These databases may include any hardware and/or software suitably configured to facilitate storing authentication and/or privilege information relating to users 100. Database 145 stores data relating to web page content. One skilled in the art will appreciate that the invention may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus which creates means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Figure 2:
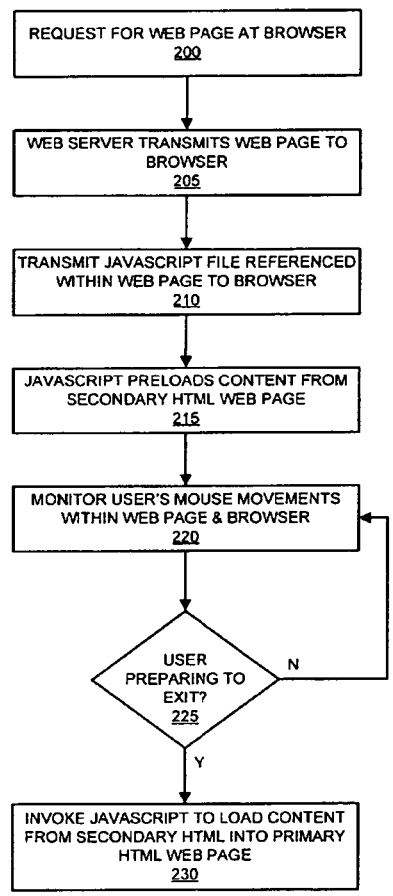
FIG. 2 is a flowchart illustrating an exemplary process for generating and displaying a popup content within primary web page content.
Figure 3:
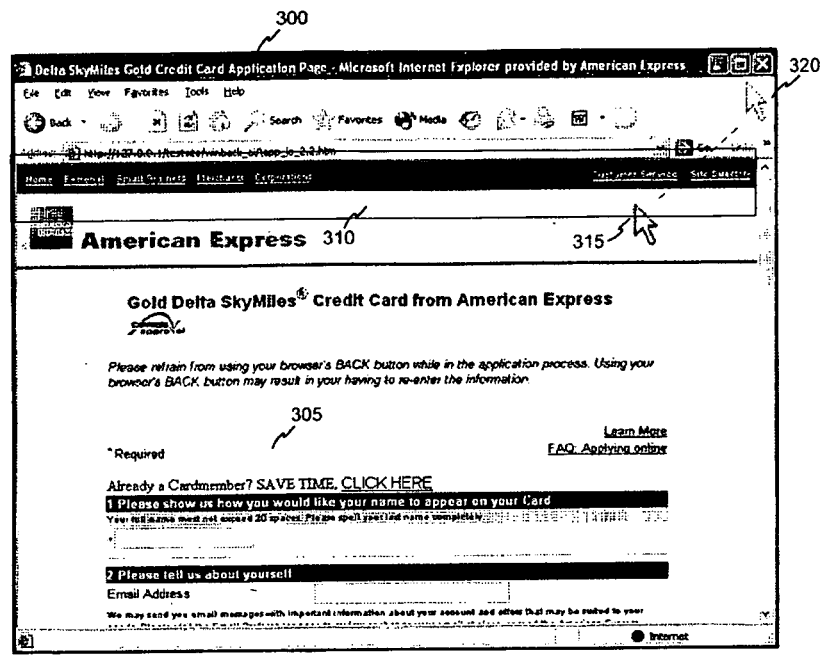
FIG. 3 is a screenshot of a web browser displaying an exemplary web page with a hidden area employed to capture mouse movements.
Figure 4:
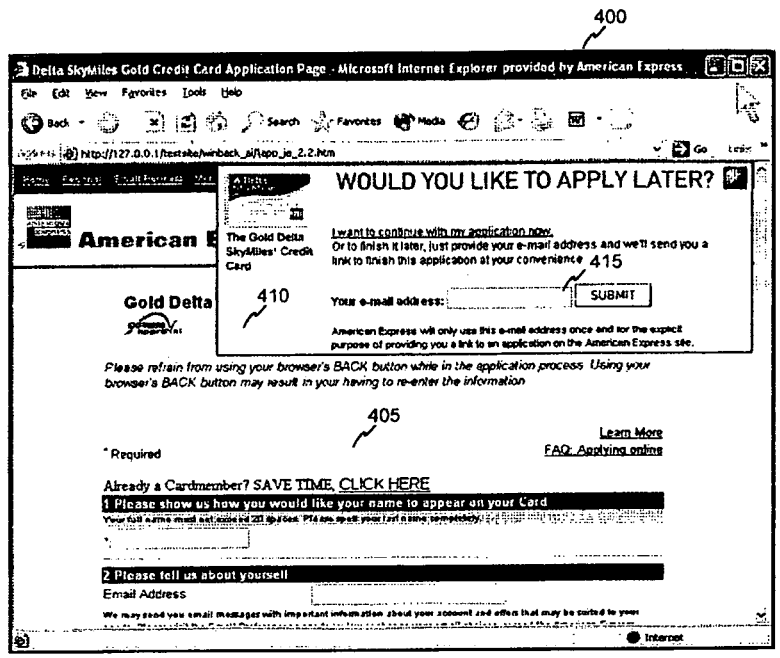
FIG. 4 is a screenshot of a web browser displaying a web page with including exemplary popup content.

Referring now to FIGS. 2-4 the process flow and screenshots depicted are merely embodiments of the invention and are not intended to limit the scope of the invention as described herein. For example, the steps recited in any of the method or process descriptions may be executed in any order and are not limited to the order presented. It will be appreciated that the following description makes appropriate references not only to the steps and user interface elements depicted in FIGS. 2-4, but also to the various system components as described above with reference to FIG. 1.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

FIG. 2 is a flowchart illustrating an exemplary process for generating and displaying a popup window within primary web page content. In the discussion of the process of FIG. 2, occasional reference will be made to the sample screenshots of FIGS. 3 and 4 to illustrate the physical attributes of the invention. Those skilled in the art will appreciate that the sample web pages illustrated and discussed herein are provided for explanation only and are not intended to limit the scope of the invention.

In one embodiment, user 100 requests a web page at a browser application (step 200) by first entering a universal resource locator (URL) for the desired web site or by selecting a link containing a URL. When web server 115 receives the request, it retrieves the proper web page and transmits it to the client browser 105 via an HTML stream (step 205). A browser application 300 compiles the HTML stream into a formatted web page 305 for display at web client 105. At the same time, or shortly thereafter, web server 115 also transmits a JavaScript file to the web client (step 210). The JavaScript file contains the code used to generate a popup window within the requested web page and is referenced within the requested web pages HTML. When received at web client 105, the JavaScript is executed, thereby pre-loading the content for a secondary web page into the memory cache of web client (step 215). The JavaScript file contains a reference to the appropriate secondary web page, and practitioners will appreciate that the invention may support any number of secondary web pages.

The popup enabled web page 305 contains a hidden section 310, that when loaded within a browser application 300, resides, in one embodiment, near the top and extends to the outer edges of the web page 305. The hidden section 310 may comprise any web component capable of generating event messages. Event messages are triggered in response to mouse and/or keyboard actions and handlers may be scripted within the web page markup language to perform tasks in response to event messages. For example, a graphic may be added to a web page and a developer may write a corresponding handler which is scripted to respond to a "mouseover" event by substituting a first graphic with a second graphic. As a result, when a user moves the mouse pointer over the first graphic, the "mouseover" event fires and is captured by the handler which substitutes the first graphic with the second graphic.

The hidden section 310 waits for user's 100 mouse movements within the web page 305 to determine if the user 100 is moving the pointer 315 toward the menu portion of the browser application (step 220). Such movement may indicate that user 100 is preparing to enter a new URL in the address bar or intends to close the browser window housing the web page. If the mouse pointer passes over the hidden area 310, a "mouseover" is event is fired (step 225). A handler within the web page 305 captures the event to invoke the pre-loaded JavaScript which loads the content of the secondary web page into the primary web page (step 230). As long as user 100 does not move the mouse pointer 315 over the hidden area (step 225), it remains active to continue monitoring user's 100 mouse movements (step 225).

Under the prior art, web pages are scripted to respond to "pageunload" events which are triggered when a user closes the browser window or navigates to another URL. The event trigger invokes a script to launch another window in response. In one embodiment of the invention, the popup is displayed within the web page prior to an action that would trigger a "pageunload" event. Therefore, the invention incorporates a method of anticipating a user's intentions prior to action being taken. Referring to FIGS. 3 and 4, a web page 305 is illustrated with a hidden area 310 serving a mouse pointer sensor. The web browsers 300 menus, control bar, address field and close box are all positioned above the web page 305 viewing area. In this example, a user intending to close the browser application will likely move the mouse pointer 315 from the web page 305 viewing area toward the web browsers close box 320. The mouse pointer passing over the hidden area 310 triggers a "mouseover" event. A handler scripted into the web page 305 receives the event trigger and invokes JavaScript file 125 to retrieve the pre-loaded secondary web page content from a web client 105 memory cache. The script further integrates the secondary web page content 410 into the content of the web page 405. In another embodiment, the invention employs a "mouseleave" event handler in order to indicate that user 100 has moved the mouse pointer beyond the web page viewing area. In yet another embodiment, a mouse pointers interaction with the hidden area 310 may invoke the removal of the secondary web page content 410. However, practitioners will appreciate that there are a number of web browser events that may be captured by the invention in order to trigger the integration of secondary web content within the primary web page 405.

Because the secondary content used to create the popup is stored within the web client 105 memory cache, the popup can be loaded very quickly in order to catch the attention of the user 100 prior to closing the browser window 400 or any other event that would direct the user away from the web page. According to the example screenshot presented in FIG. 7, the popup may include a field inviting user 100 to enter their email address 415 in order to provide a follow-up email to the user.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A computer-implemented method for facilitating a display of popup content within a previously loaded web page while avoiding activation of popup suppression, said method including:

detecting, by a computer-based system for facilitating said display of said popup content, an event message from a hidden area in a first field of said previously loaded web page, wherein said hidden area has a vertical position and a horizontal dimension, wherein said horizontal dimension is substantially the same as a horizontal width of said previously loaded web page, and wherein said hidden area lacks any association with visible content on said previously loaded web page, wherein said hidden area is absent of visible content and lacks indicia and, wherein said vertical position is located between primary web page content and a browser toolbar;

determining, by said computer-based system and based upon said event message, a user action wherein said user action comprises at least one of: an action taken toward closing said web page or an action taken toward navigating away from said web page;

causing, by said computer-based system and in response to said determining, said popup content to be displayed as visibly perceptible content in a second field overlaying at least a portion of said previously loaded web page visible content, wherein said second field is displayed within the bounds of said previously loaded web page, wherein said popup content was loaded with the loading of said previously loaded web page, and wherein said event message is selected from a group comprising: a mouse pointer interfacing with said hidden area and a keyboard interaction; and avoiding activation of a popup suppression utility.

2. The method of claim 1, wherein said causing said popup content to be displayed includes:

receiving a request for said web page at a server, wherein said request originates from a client;

retrieving said web page at said server;

retrieving a script file corresponding to said web page at said server;

transmitting said web page with said script file to said client;

executing said script file at said client to preload said popup content from said server into memory of said client; and monitoring for said mouse pointer interfacing with said hidden area.

3. The method of claim 2, wherein said script file is a JavaScript file.

4. The method of claim 1, wherein said event message is said mouse pointer interfacing with said hidden area, and further including integrating said popup content within said web page upon said mouse pointer interfacing with said hidden area.

5. The method of claim 4, wherein said step of causing said popup content to be displayed upon a mouse pointer interfacing with said hidden area, includes interfacing with said hidden area by at least one of a mouse pointer leaving and a mouse pointer entering, said hidden area.

6. The method of claim 4, further including removing said popup content upon a mouse pointer subsequently interfacing with said hidden area.

7. A non-transitory tangible computer-readable medium having computer-executable instructions stored thereon that, if executed by a computer for facilitating a display of popup content within a previously loaded web page, cause said computer to perform a method comprising:

detecting, by said computer, an event message from a hidden area in a first field of said previously loaded web page, wherein said hidden area has a vertical position and a horizontal dimension, wherein said horizontal dimension is substantially the same as a horizontal width of said previously loaded web page, and wherein said hidden area lacks any association with visible content on said previously loaded web page, wherein said hidden area is absent of visible content and lacks indicia and, wherein said vertical position is located between primary web page content and a browser toolbar;

determining, by said computer and based upon said event message, a user action wherein said user action comprises at least one of: an action taken toward closing said web page or an action taken toward navigating away from said web page;

causing, by said computer and in response to said determining, said popup content to be displayed as visibly perceptible content in a second field overlaying at least a portion of said previously loaded web page visible content, wherein said second field is displayed within the bounds of said previously loaded web page, wherein said popup content was loaded with the loading of said previously loaded web page, and wherein said event message is selected from a group comprising: a mouse pointer interfacing with said hidden area and a keyboard interaction; and avoiding, by said computer, activation of a popup suppression utility.

8. The computer-readable medium of claim 7, wherein said displaying said popup content includes:

receiving a request for said web page at a server, wherein said request originates from a client;

retrieving said web page at said server;

retrieving a script file corresponding to said web page at said server;

transmitting said web page with said script file to said client;

executing said script file at said client to preload said popup content from said server into memory of said client; and monitoring for said mouse pointer interfacing with said hidden area.

9. The computer-readable medium of claim 8, wherein said script file is a JavaScript file.

10. The computer-readable medium of claim 7, wherein said event message is said mouse pointer interfacing with said hidden area, and further including integrating said popup content within said web page upon said mouse pointer interfacing with said hidden area.

11. The computer-readable medium of claim 10, wherein said step of causing said popup content to be displayed upon a mouse pointer interfacing with said hidden area, includes interfacing with said hidden area by at least one of a mouse pointer leaving and a mouse pointer entering, said hidden area.

12. The computer-readable medium of claim 10, further comprising removing said popup content upon a mouse pointer subsequently interfacing with said hidden area.

13. The method of claim 1, wherein said hidden area is independent of said primary web page content.

14. The method of claim 1, wherein said hidden area facilitates said display of popup content when a user intends to at least one of: close a browser window and navigate to a different web site.

15. The method of claim 1, wherein said popup content is advertising content.

16. The method of claim 1, wherein said hidden area is unknown to a user.

17. The method of claim 16, wherein said hidden area is located directly below an address bar of a web browser application.

18. The method of claim 17, wherein said hidden area covers a viewable area of said web browser application which lacks said content and an image.

19. A system comprising:
a tangible, non-transitory memory communicating with a processor for facilitating a display of popup content within a previously loaded web page while avoiding activation of popup suppression,
the tangible, non-transitory memory having instructions stored thereon that, in response to execution by the processor, cause the processor to perform operations comprising:
detecting, by said processor, an event message from a hidden area in a first field of said previously loaded web page, wherein said hidden area has a vertical position and a horizontal dimension, wherein said horizontal dimension is substantially the same as a horizontal width of said previously loaded web page, and wherein said hidden area lacks any association with visible content on said previously loaded web page, wherein said hidden area is absent of visible content and lacks indicia and, wherein said vertical position is located between primary web page content and a browser toolbar;
determining, by said processor and based upon said event message, a user action wherein said user action comprises at least one of: an action taken toward closing said web page or an action taken toward navigating away from said web page;
causing, by said processor and in response to said determining, said popup content to be displayed as visibly perceptible content in a second field overlaying at least a portion of said previously loaded web page visible content, wherein said second field is displayed within the bounds of said previously loaded web page, wherein said popup content was loaded with the loading of said previously loaded web page, and wherein said event message is selected from a group comprising: a mouse pointer interfacing with said hidden area and a keyboard interaction; and
avoiding, by said processor, activation of a popup suppression utility.

* * * * *